United States Patent [19]
Takamura et al.

[11] Patent Number: 5,143,510
[45] Date of Patent: Sep. 1, 1992

[54] LEAD FRAME SEPARATING DEVICE

[75] Inventors: Tohru Takamura; Ryuta Yamaguchi; Noboru Fujino, all of Tokyo, Japan

[73] Assignee: Kabushiki Kaisha Shinkawa, Tokyo, Japan

[21] Appl. No.: 609,425

[22] Filed: Nov. 5, 1990

[51] Int. Cl.$^5$ .......................................... B65G 59/04
[52] U.S. Cl. ................... 414/796.7; 271/153; 414/797; 414/926
[58] Field of Search .................. 271/147; 152/153; 414/796.7, 797, 924, 926, 796.9

[56] References Cited

U.S. PATENT DOCUMENTS 3,586,314 6/1971 Samoggia ..................... 271/153 X
4,106,765 8/1978 Britt et al. .................... 271/153 X

FOREIGN PATENT DOCUMENTS 8702808 5/1987 PCT Int'l Appl. ............... 271/147
8704141 7/1987 PCT Int'l Appl. ............. 414/796.7
710501 6/1954 United Kingdom ............... 271/153

Primary Examiner—Robert J. Spar
Assistant Examiner—Janice Krizek
Attorney, Agent, or Firm—Koda and Androlia

[57] ABSTRACT

A lead frame separating device which picks up lead frames stored in a lead frame magazine has downwardly urged detection probes which come in contact with the uppermost lead frame raised by a lead frame lift and a detection sensor which detects movement of the detection probes. With signals from the sensor, a chuck picks up the lead frame.

2 Claims, 3 Drawing Sheets

LEAD FRAME SEPARATING DEVICE

BACKGROUND OF THE INVENTION

1. Field of the Invention

The present invention relates to a lead frame separating device.

2. Prior Art

In a manufacturing process of semiconductor devices, for example, molded lead frames which are stacked in a magazine are removed from the magazine one at a time and supplied to a marking device, where marking is performed on the lead frames.

One example of conventional lead frame separating devices which takes lead frames out of a lead frame magazine is shown in FIG. 4.

A lead frame magazine 2 which accommodates therein lead frames 1 has an opening 2a at the bottom and a vertical groove 2b on the side wall. A bottom plate 3 is placed inside the magazine 2 so that the lead frames 1 are stacked on this bottom plate 3. The bottom plate 3 is fixed to a fixing section of the marking device.

A feed screw 4 and a guide rod 5 are installed in upright positions on one side of the magazine 2. The feed screw 4 is supported by upper and lower supporting plates 6 and 7 so that it is free to rotate. The guide rod 5 is fixed to the supporting plates 6 and 7 at its upper and lower ends.

The output shaft of a motor 8 is connected to the feed screw 4, and this female screw 9 is installed on the feed screw 4. The female screw 9 can slide along the guide rod 5. A lifting member 10 installed beneath the magazine 2 is fastened to the female screw 9. The lifting member 10 is slightly smaller than the opening 2a of the magazine 2. Provided above the magazine 2 are chucking claws 11 which are of a known chucking device. The chucking claws 11 are positioned at a chucking position where the lead frames 1 are picked up. A detection sensor 12 is installed at the chucking position.

When the feed screw 4 is rotated by the motor 8, the lead frames 1 are lifted by the lifting member 10. When the lead frames 1 are raised, the uppermost lead frame 1 is detected by the detection sensor 12. The rotation of the motor 8 is stopped by a signal from the sensor 12, so that the uppermost lead frame 1 is stopped at the chucking position. This lead frame 1 is then chucked by the chucking claws 11.

In the conventional lead frame separating devices described above, the detection position of the detection sensor 12 varies depending upon the lead frames 1. In other words, as a result of variations in the thicknesses of the lead frames 1 and of warping, twisting, etc. of the frames, the detection position can change. In some cases, therefore, proper chucking of the lead frames 1 by the chucking claws 11 is not obtainable. Also, if the type of lead frame 1 being handled is changed, the position of the detection sensor 12 must be adjusted, and this adjustment work takes a considerable amount of time.

SUMMARY OF THE INVENTION

Accordingly, the object of the present invention is to provide a lead frame separating device which allows secure chucking of lead frames and adjustments to be made in a short period of time when the type of lead frame to be handled is changed without any special adjustment works.

The object of the present invention is accomplished by a unique structure for a lead frame separating apparatus which includes a raising and lowering means or a lifting member which raises lead frames stacked in a lead frame magazine, a chuck means provided above the magazine so as to chuck the uppermost lead frame which has been raised by the raising and lowering means, a detection member which is urged downward and can move up and down so that it comes into contact with the raised, uppermost lead frame, and a detection sensor which detects the movement of the detection member.

When the lead frames are raised by the raising and lowering means, the uppermost lead frame comes into direct contact with the detection member and then raises the detection member. Since the detection member is kept urged downwardly, the lead frame is pressed by this downwardly urging force, resulting in that warping or twistings are straightened out. When the detection member is lifted upward, this motion is detected by the detection sensor. The thus detected lead frame is raised to a predetermined position (i.e., the chucking position) with respect to the level of lead frame and is chucked by the chucking means.

DETAILED DESCRIPTION OF THE INVENTION

Figure 4:
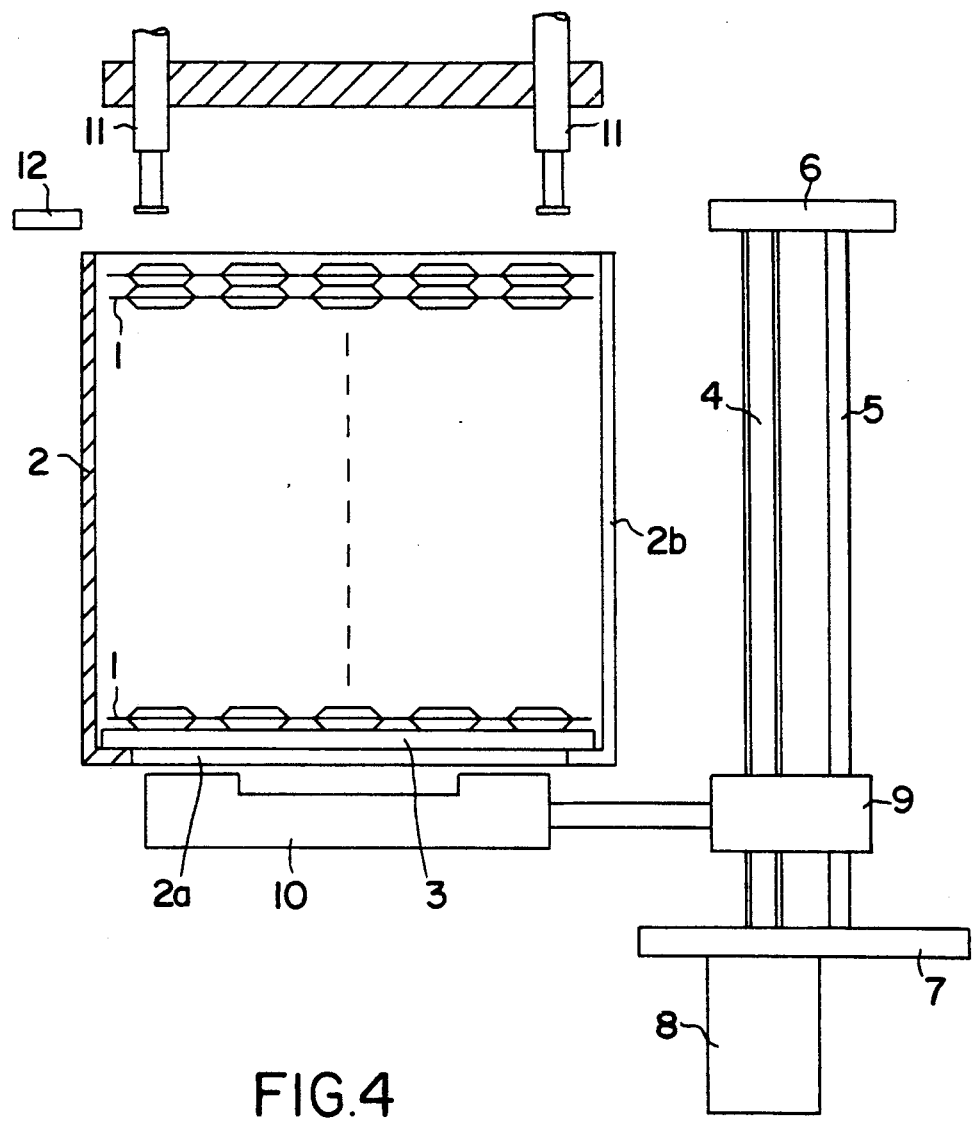
FIG. 4 is a schematic front view of a conventional apparatus.

One embodiment of the present invention will be described with reference to FIGS. 1 and 2. Elements equivalent to those shown in FIG. 4 are labeled the same number, and a detailed description of such elements will be omitted.

Figure 1:
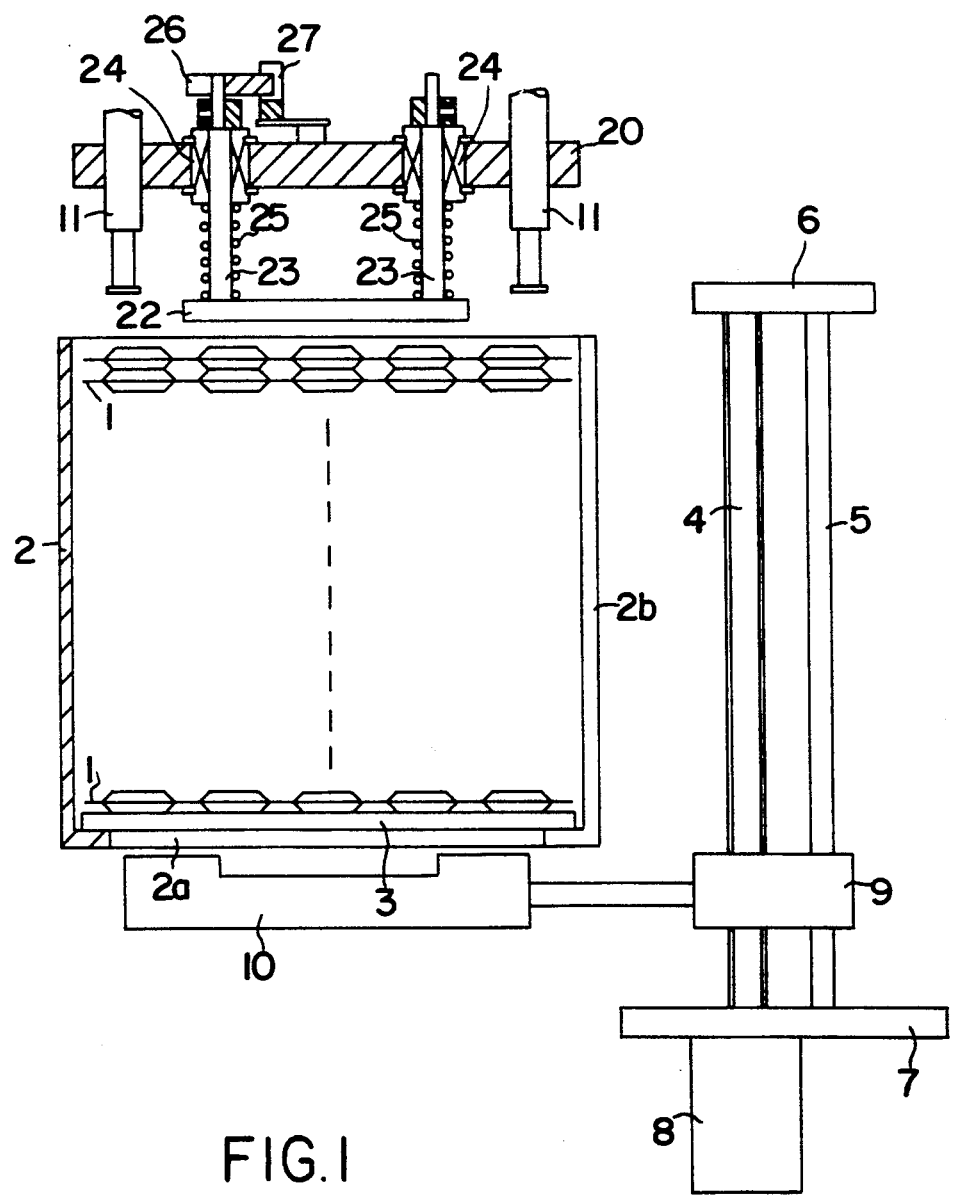
FIG. 1 is a front view of the lead frame separating apparatus in accordance with the present invention.
Figure 2:
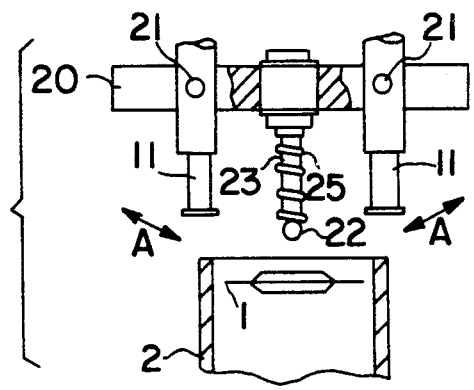
FIG. 2 is a partial side view of FIG. 1.

In FIG. 1, a pair of chucking claws 11 are installed above the magazine 2 so that they face each other. Two sets of such paired chucking claws 11 are provided so as to match the longer sides of the lead frames 1. The chucking claws 11 are supported on the supporting plate 20 via supporting shafts 21 so that the claws 11 are rotatable. The claws 11 can swing in the direction indicated by arrows A in FIG. 2 via air-pressure actuator, etc. (not shown). The lead frames 1 are chucked by this swing action of the chucking claws 11.

A detection member 22 is positioned in the area defined by the chucking claws 11. Two guide rods 23 are fixed to the upper surface of the detection member 22. These guide rods 23 are inserted in the supporting plate 20 with bearings 24 interposed. Thus, the guide rods 23 are vertically slidable. The guide rods 23 are urged in a downward direction by compressed coil springs 25 which are mounted on the guide rods 23.

A flag 26 is attached to the upper end of one of the guide rods 23. A non-contact type detection sensor 27 mounted to the supporting plate 20 detects the movement of the flag 26 and outputs necessary signals.

Motor 8 is controlled by a control circuit (not shown). Via this control circuit, the motor 8 rotates by a fixed amount (the amount required in order to grasp the lead frame 1) in accordance with the output signal supplied from the detection sensor 27.

Figure 3:
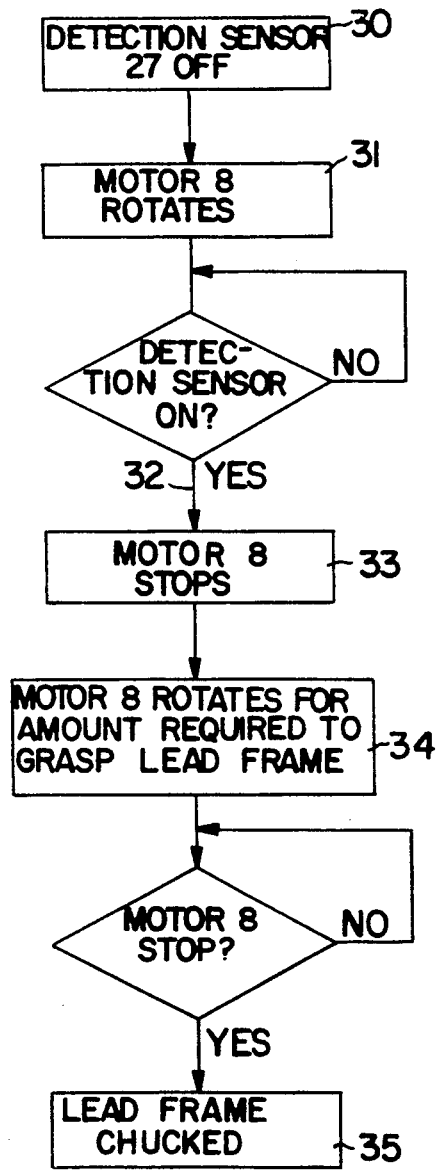
FIG. 3 is a flow chart showing steps taken during by the pick up process of the present invention.

The operation of the lead frame separating device will be described with reference to the flow chart of FIG. 3.

When the detection member 22 is not in contact with the lead frame 1, the detection sensor 27 is in an "off" position at step 30.

When the motor 8 is rotated at step 31 to raise the lifting member 10, the uppermost lead frame 1 comes into contact with the detection member 22.

When the lead frame 1 is lifted upward against the downwardly urging force of the compressed coil springs 25, the flag 26 rises and the detection sensor 27 is switched "on" at step 32.

As a result, the rotation of the motor 8 is stopped at step 33 by the output signal from the detection sensor 27.

Next, the motor 8 is again rotated at step 34 for the amount required to chuck the uppermost lead frame 1 by the chucking claws 11, and the lead frame 1 is raised.

After this, an air-pressure actuator (not shown) is operated so that the chucking claws 11 swing. As a result of this swing motion of the claws 11, the uppermost lead frame 1 is chucked at step 35.

The supporting plate 20 is raised and moved horizontally by an appropriate driving means that is not shown in the drawings. Thus, the chucked lead frame 1 is sent to a predetermined place for the next process to be done thereon.

With this transfer action, one cycle of the separating operation is completed. Afterward, by repeating the steps, the following stacked lead frames 1 are successively chucked by the chucking claws 11 and fed out as described above.

Since the lead frames are raised and the downwardly urging force of the coil springs 25 presses the detection member 22 against the lead frame 1 so that warping or twisting of the lead frame 1 is cleared, the detection member 22 can detect the level of the uppermost lead frame 1 accurately. Therefore, improper chucking of the lead frames is prevented. If the type of the lead frame is changed, the chucking position can be altered by merely altering the data which causes the motor 8 to rotate by the amount required to grasp such different lead frames. Thus, adjustment for different types of lead frames can be performed very quickly.

In the above description, the motor 8 is set to temporarily stop at step 33 after the detection sensor 27 is switched "on" at step 32. However, this step 33 of the motor 8 may be omitted.

As is clear from the above description, according to the present invention, a detection member detects the position of the uppermost lead frame when it contacts the lead frame directly. The detection member clears any warping or twisting of the lead frames by being pressed against the lead frames. Thus, improper chucking is prevented. In addition, adjustments can be made by merely altering the set data when different types of lead frames are processed. Accordingly, such adjustments can be performed in a short period of time.

What is claimed is:

1. A lead frame separating device comprising:
   a detection means which moves up and down said detection means being urged in a downward direction so as to contact an uppermost lead frame of a stack of lead frames in a lead frame magazine;
   a detection sensor which detects movement of said detection means and generates an output signal when said detection means contacts said uppermost lead frame;
   a chuck means installed above said lead frame magazine so as to chuck the uppermost lead frame; and
   a raising and lowering means for raising lead frames stacked in a lead frame magazine and for stopping the raising of said lead frames stacked in said lead frame magazine and then raising the lead frames in an amount required to chuck the uppermost lead frame by the chuck means, when the output signal from the detection sensor is generated; and wherein
   said detection means comprises:
      a supporting plate provided above said magazine;
      a detection member provided adjacent said chuck means;
      at least one guide rod for slidably coupling said detection member to said supporting plate; and
      a spring means provided on said guide rod for urging said detection member downwardly towards said uppermost lead frame.

2. A lead frame separating device according to claim 1 wherein said detection sensor comprises a non-contact type detection sensor coupled to said guide rod for detecting when said detection member contacts said uppermost lead frame and for generating said output signal.

* * * * *